United States Patent [19]

Golding

[11] 4,304,272
[45] Dec. 8, 1981

[54] WASHING AND FILLING MACHINES FOR CONTAINERS

[75] Inventor: Cyril G. Golding, Sedgley, England

[73] Assignee: GKN Sankey Limited, Telford, England

[21] Appl. No.: 147,496

[22] Filed: May 7, 1980

[30] Foreign Application Priority Data

May 12, 1979 [GB] United Kingdom ............... 16584/79

[51] Int. Cl.³ ............................................... B65B 3/04
[52] U.S. Cl. ........................................ 141/92; 141/94; 141/113; 141/DIG. 1
[58] Field of Search ............... 141/94, 113, 89, 90, 141/91, 92, 348, 349, DIG. 1; 251/149, 149.1, 149.2, 149.3, 149.4, 149.5, 149.6, 149.7, 149.8, 149.9, 65, 144; 137/554; 285/93; 175/40, 45; 166/65 M, 66, 250, 255, 260

[56] References Cited

U.S. PATENT DOCUMENTS

| 2,402,723 | 6/1946 | Bean | 285/93 |
|---|---|---|---|
| 3,074,670 | 1/1963 | Breuning | 285/93 |
| 3,299,417 | 1/1967 | Sibthorpe | 285/93 |
| 3,509,515 | 4/1970 | Acord | 285/93 |
| 3,738,687 | 6/1973 | Zimmerer et al. | 285/93 |
| 3,747,054 | 7/1973 | Aryanetakis | 285/93 |
| 4,006,761 | 2/1977 | Bonafous | 141/DIG. 1 |
| 4,195,673 | 4/1980 | Johnston et al. | 141/DIG. 1 |

Primary Examiner—Houston S. Bell, Jr.
Attorney, Agent, or Firm—Merriam, Marshall & Bicknell

[57] ABSTRACT

In a machine for washing or filling a beer keg via a head having a movable probe to open the valve of the keg closure unit, a complementary magnetic carried by the probe and the head for indicating when the probe is in a fully extended position within the head to open the valve and to seal with the closure unit.

4 Claims, 1 Drawing Figure

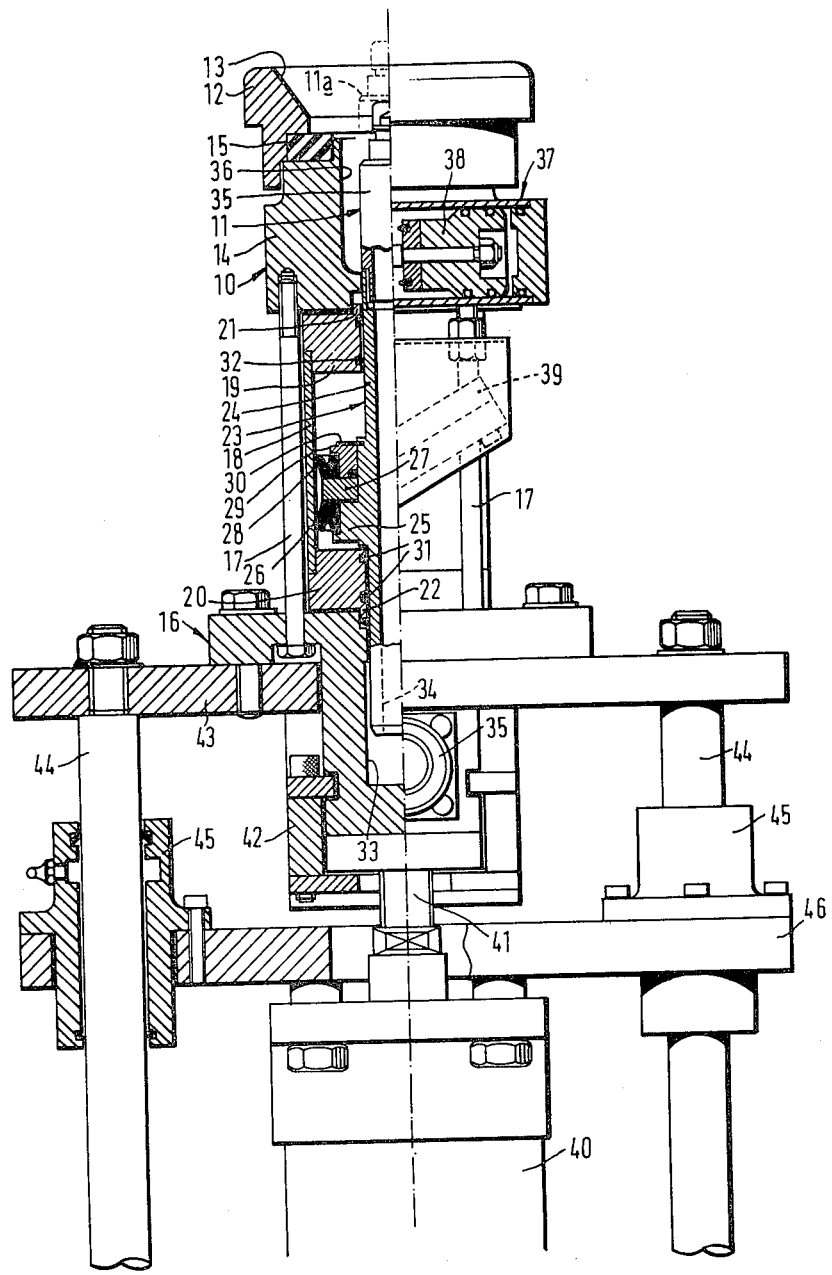

WASHING AND FILLING MACHINES FOR CONTAINERS

BACKGROUND OF THE INVENTION

This invention relates to machines for washing the interior of containers and/or filling containers, the containers having spring-loaded closure units. Specifically the invention has been developed for the washing and/or filling of beer kegs. Such a keg has a closure unit which has one or two spring-loaded valve members which act to seal the keg. The closure units are arranged so that the valve members may be opened to fill the keg, or dispense beer from the keg, with the closure unit in place in the keg. Such a keg is filled against a counter pressure of carbon dioxide and beer is dispensed from the keg under a pressure of carbon dioxide.

Washing or filling takes place through a head which engages the neck of the container which in turn contains the closure unit. The head contains a probe which is movable relative to the head to open the valve means of the closure unit against its spring loading. It is not possible to see the action of the probe during washing or filling because the probe is enclosed totally within the head or the neck. If the probe is not fully sealed to the closure unit when washing or filling takes place, malfunctioning will occur. During a washing cycle, washing liquid may not properly enter the keg. During a filling cycle there may be leakage between the beer and the $CO_2$ which will impair the quality of the beer.

It is an object of the present invention to provide means whereby the position of the probe relative to the head may be reliably sensed.

SUMMARY OF THE INVENTION

The invention is concerned with a machine for washing and/or filling with liquid containers having spring-loaded valved closure units, the washing and/or filling being carried out via a head which seals with a container to be washed or filled and which carries a probe movable relative to the head to open the closure unit of said container against the spring loading and to seal with the closure unit.

According to the invention, in such a machine, means is provided for sensing that the probe and the head are in a predetermined relative position, the sensing means comprising means on the head or probe to generate a magnetic field and means on the probe or head capable of providing a signal in response to said magnetic field when the head and probe are in said predetermined relative postion.

In practice, the predetermined relative position will be when the probe is extended from the head to open the closure means. The machine will be so arranged that if the probe does not reach its correct relative position a warning circuit or a disabling circuit for that head will be activated.

Preferably, a magnet is carried on the probe and cooperates with a magnetically-sensitive reed switch on the head.

The probe may carry a piston slidable within a cylinder forming part of the head, the piston being movable in the cylinder by fluid pressure and the piston carrying said magnet, the reed switch being mounted on the cylinder externally thereof.

BRIEF DESCRIPTION OF THE DRAWINGS

The invention will now be described in detail by way of example with reference to the accompanying drawing which is a part elevation and part section through a head and probe constructed to embody the invention.

DESCRIPTION OF THE PREFERRED EMBODIMENTS

Referring now to the drawing, the head is indicated generally at 10 and the probe at 11. The head comprises a cup 12 having a convergent bore 13 to receive the neck of a container, not shown. The cup 12 is threadedly engaged with the upper end of an upper block 14 and a sealing washer for engaging the container neck is indicated at 15. The upper block 14 is secured to a mounting plate 16 by a plurality of bolts, two of which are shown at 17. Between the block 14 and the mounting plate 16 is arranged a cylinder comprising a cylindrical brass sleeve 18 and end pieces 19 and 20 which fit within the sleeve 19 and have spigots 21 and 22 respectively to fit within locating bores in the block 14 and plate 16 respectively.

The probe 11 comprises a tubular piston 23 having a central tubular part 24 and an integral flange 25. Seated on the flange 25 is a first sealing washer 26 and above this is a magnetic collar 27. Above the collar is a further sealing washer 28 and above that a ring 29 held in position by a circlip 30. The washers 26 and 28 engage the bore of the sleeve 18. Means, not shown, is provided for introducing compressed air above or below the washer assembly 26, 28 so as to move the probe vertically up or down.

The lower portion of the tubular part 24 of the probe passes through ring seals 31 in the end piece 20 and the upper portion is sealed with ring seals 32 to the end piece 19. A chamber 23 is formed in the mounting plate 16 into which the lower part of the tubular piston 23 projects and the bore 24 of the piston communicates with the chamber and the chamber is provided with a spigot 35 so that a service can be connected to the chamber 33 and thus to the bore 34 of the tubular part 23.

The upper part of the tubular piston 23 has secured thereto a cap 35 which is so shaped as to be capable of opening and sealing with the closure member of a container. The cap is located in a chamber 36 formed in the upper block 14 and this chamber 36 is also connected to services via two outlets, not shown, via a change-over valve 37. The change-over valve includes a pneumatically operated piston 38 which is arranged so that when it is in the position shown the chamber 36 is in connection with one of the outlets of the change-over valve, the piston being movable to another position in which the chamber 36 is in communication with the other outlet of the change-over valve.

Mounted externally of the cylinder 18 is a magnetically-sensitive reed switch 39 which is sensitive to the position of the magnetic collar 27.

The whole of the head assembly is reciprocable vertically by a pneumatic ram 40 which has its piston rod 41 connected via a U-piece 42 to a bridge piece 43. The bridge piece 43 has secured thereto the mounting plate 16 and is guided for vertical movement by two guide rods 44 which slide in bushes 45 secured to the main frame of the machine, part of which is shown at 46.

In operation, the whole of the head is moved upwardly by the ram 40 to engage and seal with the neck of a container. Once the head has been sealed to the container neck the probe 11 is moved within the head from the lower position shown in full lines to the position shown in chain lines at 11a. This movement is effected by applying fluid pressure beneath the washer assembly 26, 28 thus causing the tubular piston 23 to move up within the cylinder 18. As the probe moves upwardly, it opens the valve members of the closure unit in the container so that the container may now be washed or filled via the chamber 36 and the changeover valve 37 and up through the bore 34 from the chamber 33 which is supplied by the spigot 35.

When the probe reaches its fully extended position in which it will have opened and sealed with the closure unit and the container, the reed switch 39 is operated by the magnetic collar 27. The reed switch is inserted into the control circuit of the machine and is arranged so that the washing or filling sequence of the head is only carried out if the probe is in its fully extended position as evidenced by the operation of the reed switch 39 by the magnetic collar 27.

It will be seen that the invention provides a means for signaling when the probe has reached its fully extended position. This means may be used to prevent further operation of the machine or of the head if, during the cycle the probe does not reach the position which it should during that cycle.

I claim:

1. In a machine for washing and/or filling with liquid containers having spring-loaded valved closure units, the washing and/or filling being carried out via a head which seals with the container to be washed or filled and which carries a probe movable relative to the head to open the closure unit of the container against the spring loading and to seal with the closure unit; means for sensing that the probe and the head are in a predetermined relative position, the sensing means comprising means on the head or probe to generate a magnetic field and means on the probe or head capable of providing a signal in response to said magnetic field when the head and probe are in said predetermined relative position.

2. A machine according to claim 1 including a magnet on the probe and a magnetically-sensitive reed switch on the head.

3. A machine according to claim 2 wherein the probe carries a piston slidable within a cylinder forming part of the head, the piston being movable in the cylinder by fluid pressure and the piston carrying said magnet, the reed switch being mounted externally of the cylinder.

4. A machine according to claim 3 wherein said magnet comprises a magnetic collar forming part of the piston.

* * * * *